E. M. GANT.
ROPE METER.
APPLICATION FILED SEPT. 10, 1915.
1,223,955.
Patented Apr. 24, 1917.
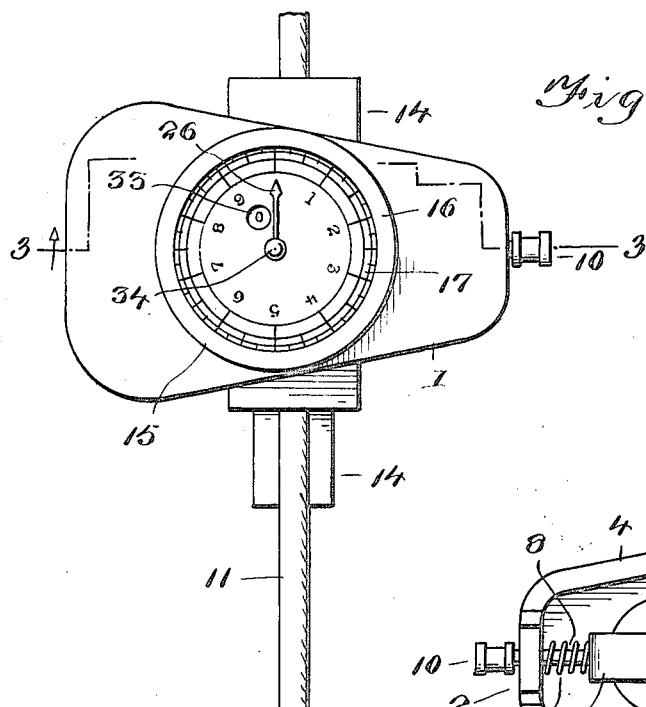
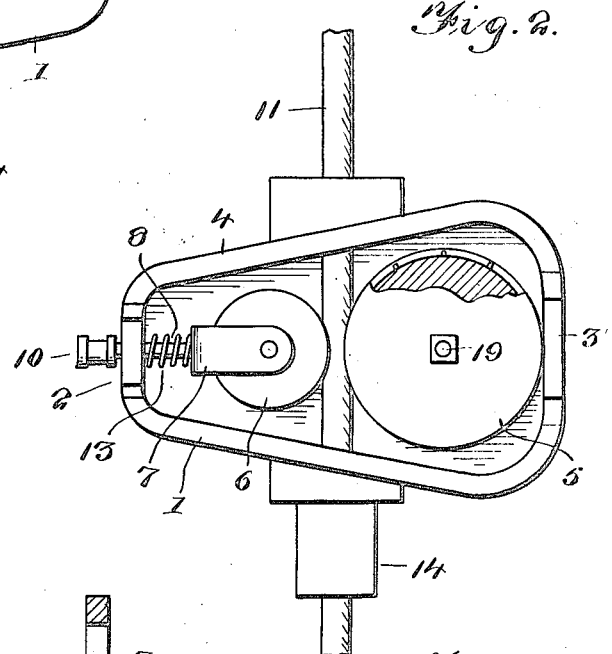
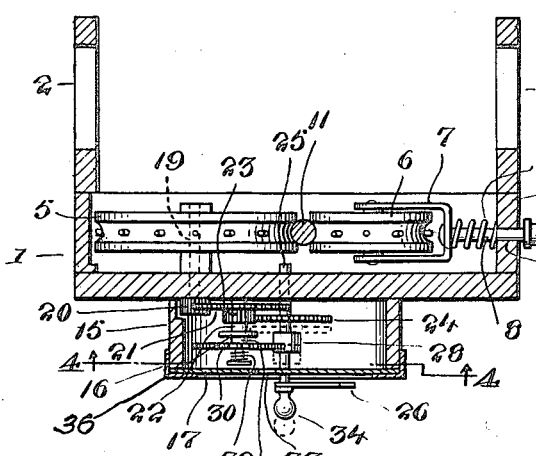
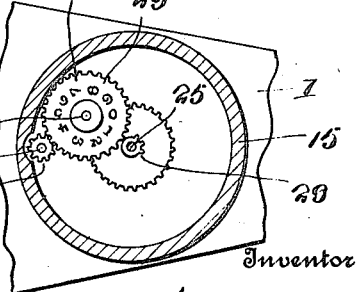
Inventor
E. M. Gant
By Victor J. Evans
Attorney

UNITED STATES PATENT OFFICE.

EUGENE M. GANT, OF ETHRIDGE, TENNESSEE.

ROPE-METER.

1,223,955.  Specification of Letters Patent.  Patented Apr. 24, 1917.

Application filed September 10, 1915. Serial No. 50,025.

*To all whom it may concern:*

Be it known that I, EUGENE M. GANT, a citizen of the United States, residing at Ethridge, in the county of Lawrence and State of Tennessee, have invented new and useful Improvements in Rope-Meters, of which the following is a specification.

This invention relates to rope meters or measurers for measuring the length of a rope, the object in view being to provide a simple and reliable rope measuring device or meter designed particularly for use in stores for the purpose of measuring off any desired length of rope required by a purchaser and thereby doing away with the tedious operation of measuring the rope by hand with the aid of a yard stick or foot measure.

A further object of the invention is to provide a simple means for returning the registering mechanism to its initial or zero point after a certain length of rope has been severed from the main supply.

With the above and other objects in view, the invention consists in the novel construction, combination, and arrangement hereinafter fully described, illustrated and claimed.

In the accompanying drawings:

Figure 1 is a face view of a rope meter embodying the present invention.

Fig. 2 is a rear view showing the main wheel for actuating the registering mechanism, and the presser wheel.

Fig. 3 is a sectional view taken through the gear case on the line 3—3 of Fig. 1 showing the gears in their normal registering position and indicating by dotted lines the position of the graduated dial face while it is being turned back to the starting point.

Fig. 4 is a view taken at right angles to Fig. 3 on the line 4—4 of Fig. 3, showing the internal registering mechanism.

Referring to the drawings 1 designates a chambered body or frame mounted upon supporting legs or brackets 2 and 3. The frame 1 comprises the surrounding flange 4 and within said flange is arranged a wheel 5 for actuating the registering mechanism hereinafter described, and also a presser wheel 6 which is journaled in a fork 7 having a stem 8 which extends outwardly through an opening 9 in the flange 4 and is provided at its outer extremity with an operating head 10 by means of which the pulley 6 may be drawn away from the wheel 5, the presser wheel or pulley 6 being journaled in the fork 7 and held against the rope 11 passing between the wheels 5 and 6 by means of a coiled expansion spring 13 which is interposed between the crown of the fork 7 and the adjacent part of the flange 4 of the frame.

The rope 11 passes through holes in the opposite portions of the flange 4 and also through guides 14 extending outwardly from the frame any suitable distance so as to guide the rope between the wheels 5 and 6. On the front of the frame 1 there is arranged a gear case 15 bearing a fixed relation to the frame 1 said gear case being circular and provided with a detachable flanged ring or binder 16 which clamps in place a dial 17 graduated as shown and marked off in numerals to indicate measurements such as inches and feet. The wheel 5 is fast on a shaft 19 which also has fast thereon a pinion 20. This pinion meshes with a large spur gear 21 on the driving arbor or shaft 22 also having fast thereon a barrel pinion 23 which meshes with and drives another gear 24 fast on a driven arbor 25 which extends through the dial 17 and has fast on the projecting extremity thereof a pointer or indicating hand 26 and also has fast thereon a mutilated pinion 28 which once in each complete revolution of the arbor 25 engages the teeth 29 of a dial faced gear 30 which is normally loose on the shaft 22 but is held against an annular shoulder 31 of the last named shaft by means of a tension spring 32. The dial faced gear 30 is numbered and graduated so as to turn intermittently a certain distance in each complete revolution of the arbor 25. According to the numbers appearing the hand 26 must make 10 complete revolutions in order to effect a single revolution of the dial faced gear 30 and in the preferred embodiment of the invention the gears hereinabove described are so proportional and designed that the indicator hand 26 makes one complete turn for every ten feet of rope drawn through the meter or measuring device. . Therefore the dial faced gear makes one complete revolution for every one hundred feet of rope drawn through the device.

The dial 17 is formed with an observation opening 33 to render the numbers on the gear 30 visible and is also apertured to allow for the passage therethrough of the arbor 25 which has knob 34 on its outer end by means of which the knob 34 and pinion 28 may be drawn toward the operator until the teeth of said pinion 28 mesh with the teeth of the gear 30, whereupon the gear 30 may be turned backwardly in order to set the same against zero leaving the device in readiness for measuring off a new length of rope. The outward pull on the arbor 25 is limited by the wheel 24 coming in contact with a stop flange or disk-shaped shoulder 36 on the arbor 22.

In the operation of the device described it is only necessary to set the registering mechanism at zero and then draw the rope through the device until the desired number of feet or other units of measurement is indicated either by the hand 26 or by the numbers on the dial faced gear 30 or both. The rope is then severed and the dial faced gear returned to its initial or zero position. Besides facilitating work and saving time on the part of the dispenser or salesman it also insures the full length of rope to the purchaser, the registering mechanism being far more accurate than the usual yard stick or foot rule now employed.

I claim:—

In a rope meter, a supporting frame, a pair of rope engaging wheels between which the rope passes, said wheels being driven by the rope, one of said wheels constituting a pressure element for holding the rope in frictional engagement with the other wheel, and registering mechanism actuated by one of said wheels and comprising a driving arbor, a driven arbor, a pointer carried by the driven arbor, a dial faced gear frictionally held on the driving arbor, a mutilated gear on the driven arbor, and means for shifting the driven arbor out of engagement with the driving arbor without shifting the mutilated gear out of engagement with the dial faced gear to reset the registering mechanism.

In testimony whereof I affix my signature in presence of two witnesses.

EUGENE M. GANT.

Witnesses:
C. E. LOCKE,
R. A. BRIAN.